United States Patent Office 3,272,885
Patented Sept. 13, 1966

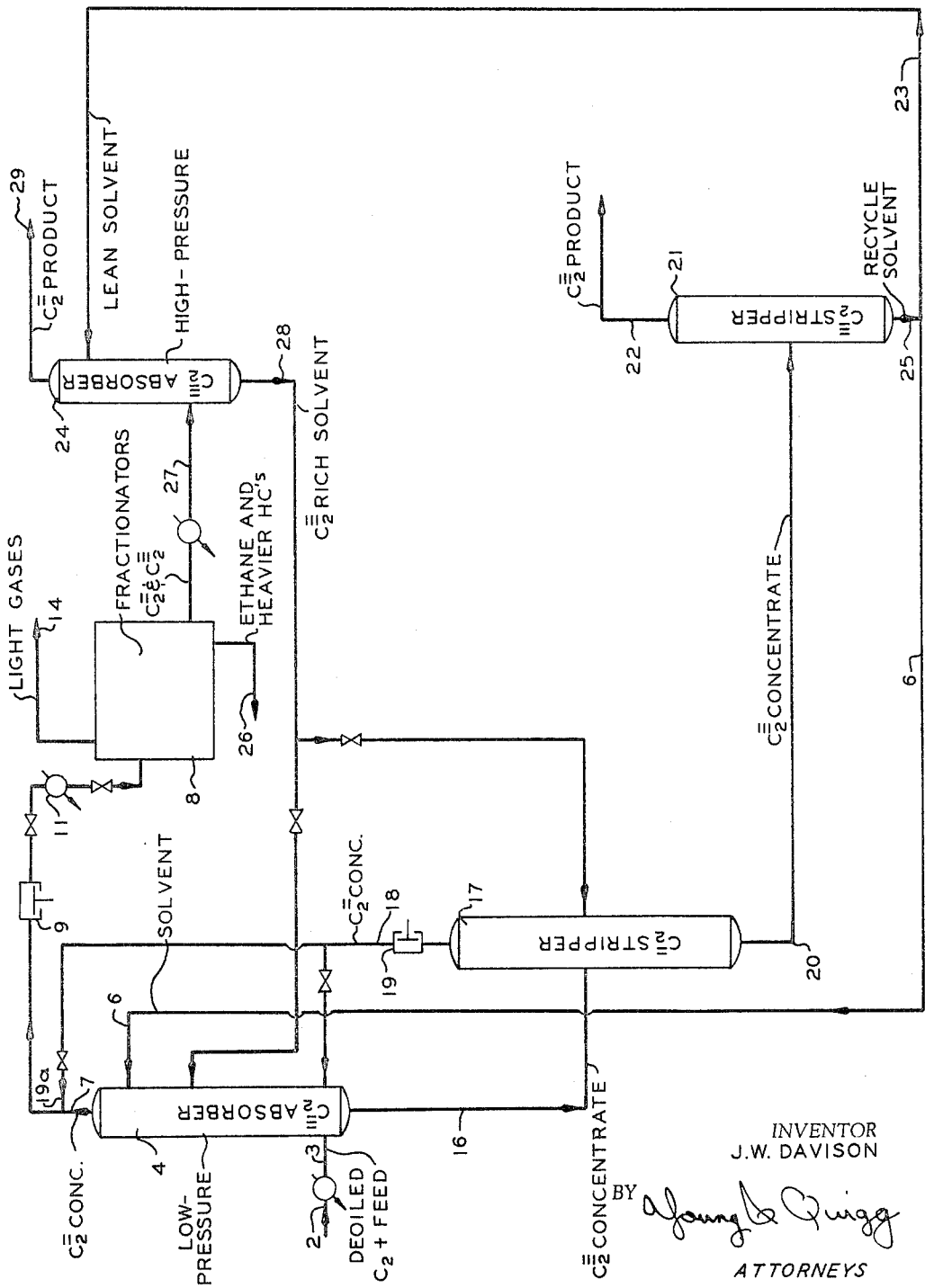

3,272,885
SEPARATION OF ETHYLENE FROM ACETYLENE
Joseph W. Davison, Bartlesville, Okla., assignor to Phillips Petroleum Company, a corporation of Delaware
Filed Oct. 1, 1962, Ser. No. 227,147
9 Claims. (Cl. 260—677)

The invention relates to a method for the separation of ethylene and acetylene from a reactor effluent.

Ethylene in recent years has found increasing importance in the petro-chemical industries. For example, it is frequently used as a chemical intermediate in the preparation of such materials as acetaldehyde, acetic acid, ethanol, ethylene glycol, ethylene oxide, etc. By far the largest use of ethylene, however, both present and prospective, lies in the polymerization field and specifically in the catalytic polymerization of ethylene to normally solid polymers. Ethylene, while naturally occurring in petroleum, is obtained principally by the dehydrogenation and/or cracking of low-boiling paraffin hydrocarbons such as ethane, propane, butane, etc. In the process of manufacture of ethylene from paraffins, various side products are formed in small quantities. These include such materials as acetylene, carbon monoxide, carbon dioxide, and oxygen. Due to the sensitivity of the various polymerization catalysts to these materials it is desirable when utilizing ethylene as a feed material in the polymerization process to first remove any side products.

Similarly, acetylene has established importance as a chemical building block. It is likewise desirable to recover the smaller percentage of acetylene present in the effluent from the cracking furnace of an ethylene plant, if this were economically practical.

In one process, the removal of undesirable compounds from the raw ethylene is provided by passing the feed material through a series of treating operations in which the ethylene is contacted with various chemical treating agents. Some of the chemicals used are expensive and require extensive treatment, involving heating and cooling operations, to effect their recovery for reuse in the process. The over-all purification process thus requires a substantial expenditure of thermal energy due to the large number of process streams which must be heated or cooled during the operation. In order to reduce the consumption of energy, where possible, various process streams are utilized for heating and cooling.

It is then apparent that a means of processing a feed stream containing substantial quantities of both ethylene and acetylene, such as from a tangential reactor, so as to recover both constituents as substantially pure products, and with a lower energy requirement than possible heretofore, would constitute a step forward in the art.

It is, therefore, an object of this invention to provide an improved process for the separation of ethylene and acetylene from hydrocarbon gas mixtures containing the same.

It is another object of this invention to provide a process for increasing the thermal efficiency of separation of the constituents of the effluent from an ethylene producing plant.

It is a still further object of this invention to provide a process for economically and separately recovering both ethylene and acetylene from a pyrolysis gas containing significant quantities of each.

The foregoing objects are obtained broadly in the operation of a separation process, by passing a gas mixture containing both $C_2H_4$ and $C_2H_2$, such as would be obtained from a reactor and which has been deoiled, to a first absorber to be contacted countercurrently with a solvent selective for the acetylene constituent present, which step "roughly" separates the absorber feed into an overhead stream of ethylene concentrate and a bottoms stream of acetylene concentrate. The latter stream passes to an ethylene stripper, which removes substantially all the remaining ethylene, producing a second ethylene concentrate overhead that passes to the first ethylene stream or back to the first absorber. A bottoms stream of solvent rich in acetylene passes to a second stripper for providing solvent for recycle and recovery of acetylene as a product. The ethylene concentrate passes to a second absorber to be contacted countercurrently therein with additional solvent selective for any remaining acetylene, which produce a bottom stream of acetylene-rich solvent, and permits recovery of relatively pure ethylene as overhead product therefrom.

The invention is best described by reference to the accompanying drawing which is a schematic illustration of an ethylene and acetylene separation process, using dimethyl formamide as the selective solvent, and a deoiled $C_2$ effluent from a reactor as the feed to the process.

Referring now to the drawing, a hydrocarbon gaseous mixture from a reactor, containing a major portion of ethylene and acetylene, lighter gases, ethane, and heavier hydrocarbons, which has been previously deoiled (not shown) and preferably refrigerated by cooler 2, is fed via conduit 3 to the lower portion of column 4, serving as an absorber. Dimethyl formamide (DMF), a solvent selective for acetylenes present in an ethylene-containing stream, is introduced into the upper portion of absorber 4 via conduit 6. The DMF is essentially anhydrous. The gaseous feed passes upwardly countercurrent to the downwardly moving liquid solvent, with most of the acetylene in the feed being absorbed in the solvent. The conditions preferred for absorber 4 are about −20° F. top, 0° F. bottom, and 30 p.s.i.a. The overhead stream from the absorber, comprising an ethylene concentrate, is passed via conduit 7 to fractionators 8 for separation of light gases, such as oxygen, hydrogen, methane, carbon dioxide, and nitrogen, from the acetylene, ethylene, and heavier hydrocarbons.

Disposed in conduit 7 is a compressor 9 and another cooler 11. The overhead conduit 14 is provided for venting these light gases from the system.

Returning again to absorber 4, the bottoms stream therefrom, comprising solvent enriched with acetylene, is passed via conduit 16 to the middle portion of column 17, serving as an ethylene stripper. Conditions preferred for stripper 17 are about 80° F. top, 175° F. bottom, and 22 p.s.i.a. The overhead ethylene stream from stripper 17, low in acetylene, passes via conduit 18 having compressor 19 therein, back to the bottom portion of absorber 4. If the acetylene content is essentially zero, stream 18 may alternatively be passed via 19a to conduit 7, by manipulation of the suitably placed valves.

The bottoms stream from stripper 17, comprising acetylene-rich solvent, but free of ethylene, passes via conduit 20 to the middle portion of another column 21, serving as an acetylene stripper. Conditions preferred for stripper 21 are about 170° F., top, 327° F. bottom and 20 p.s.i.a. Relatively pure acetylene is recovered overhead via conduit 22, as a product of the process, perhaps already suitable for direct use in chemical synthesis. The bottoms stream 25 from stripper 21 is lean solvent, which may be recycled via conduits 6 and 23, to absorbers 4 and 24, respectively.

The bottoms stream from fractionators 8, comprising $C_2$ and higher hydrocarbons leaves via conduit 26 and may be returned to the tangential reactor (not shown) for cracking.

The resulting overhead stream from fractionators 8, comprising almost entirely ethylene and some acetylene, passes via conduit 27 to the middle portion of column 24, serving as an absorber. Lean dimethyl formamide solvent, is introduced from conduit 23 into the upper portion of absorber 24, flowing downwardly therethrough.

The acetylene remaining in stream 27 is absorbed in this solvent as it flows upwardly countercurrent therethrough. Conditions preferred in absorber 24 include about —20° F. top, 0° F. bottom, and 275 p.s.i.a.

The acetylene-enriched solvent passes from the bottom portion of absorber 24 via conduit 28 back to the middle portion of absorber 4, or alternatively to ethylene stripper 17. Relatively pure ethylene is recovered overhead from absorber 24 via conduit 29 as product of the process, suitable for direct use in chemical synthesis without further purification.

Regarding the deoiled feedstock to absorber 4, it is obtained usually by the pyrolysis of low boiling paraffin hydrocarbons, such as ethane, propane, butane, and mixtures thereof. The reaction is carried out at elevated temperatures, for example, when ethane is utilized as a feed material the reaction takes place in the range of 1400 to 1600° F. When higher boiling hydrocarbons are pyrolyzed it is found that the reaction proceeds at somewhat lower temperatures. Usually it is desirable to operate with low pressures since higher pressures have an adverse effect on the reaction equilibrium. The reaction proceeds rapidly therefore it is preferable to maintain a short reaction residence time, usually between about 0.5 and about 0.8 sec. In order to minimize coking and aid in obtaining the desired residence time, it is customary to dilute the feed material with an inert gas, such as steam.

It will be obvious to those skilled in this art that the liquid-vapor contact or extraction step in which acetylene is separated from the other constituents of the $C_2$ feed can be effected under widely varying conditions which give liquid phase separation. Thus, if refrigeration is available at a temperature lower than —60° F., say at —66° F. or lower, the absorbers 4 and 24 can obviously be operated at lower pressure than those which would correspond to the temperatures just mentioned. The temperature is obviously limited only by the freezing point of the solvent used.

Although the invention has been described in a specific embodiment with relation to the removal of acetylene from a mixture containing it, ethylene, and other gases, by liquid-liquid contact with dimethyl formamide, it is obviously not limited thereto. For example, it is obvious that solvents other than dimethyl formamide selective for acetylenic hydrocarbons can be used, such as dimethyl sulfoxide, acetone, acetic anhydride, and other dialkyl amides, such as diethyl acetamide, diethyl formamide, and the like. Further, other systems comprising different acetylenic hydrocarbons can be processed by this invention. For example, methyl acetylene can be removed from a mixture of it, propylene, and other gases with a suitable solvent, for example, dimethyl formamide. Also, ethyl acetylene and/or vinyl acetylene can be removed from a mixture comprising butylenes and/or butadiene. Diacetylene can be removed from a normally gaseous mixture by the process of this invention. Additional selective solvents, systems, and applications of this invention will be apparent to one skilled in the art in possession of this disclosure.

It will be observed by the disclosed combination of steps and operating conditions, a minimum cost process is achieved for simultaneous recovery of high purity acetylene and ethylene from a feed stream containing both together with other impurities. Thus, energy requirements are minimized by operating absorber 4 at low pressure, and without total removal of acetylene from overhead stream 7. Removal of the remaining acetylene is effected more economically in high pressure absorber 24. Further economies are also added by operating fractionators 8 intermediate the low and high pressure absorbers. Still improved economies is effected by use of intermediate stripper 17 wherein some acetylene is allowed to go overhead in stream 18, and is recovered by recycle through absorber 4.

The following material balance will aid in a more complete understanding of the embodiment of the invention which has been described by reference to the drawing.

*Combined acetylene-ethylene plant*

| Stream (Mols) | Low Pressure Absorber Inlet (3) | Low Pressure Lean Solvent (6) | Low Pressure Absorber Overhead (7) | Fractionated Lights (14) | Low Pressure Absorber (16) Rich Solvent | $C_2H_4$ Stripper Overhead Vapors (18) | $C_2H_4$ Stripper Kettle Liquid (20) |
|---|---|---|---|---|---|---|---|
| Methane and lighter | 1,205.1 | | 1,205.1 | 1,205.1 | 17.7 | 17.7 | |
| Carbon dioxide | 254.8 | | 254.8 | 254.8 | 44.8 | 44.8 | |
| Acetylene | 217.5 | | 4.1 | .1 | 1,207.4 | 990.0 | 217.4 |
| Ethylene | 281.0 | | 445.1 | | 14.8 | 14.8 | |
| Ethane and heavier | 27.2 | | 13.7 | | 31.2 | 17.7 | 13.5 |
| Solvent (DMF) | | 3,621.2 | | | 4,058.0 | .8 | 4,057.2 |
| Totals | 1,985.6 | 3,621.2 | 1,923.4 | 1,460.0 | 5,373.9 | 1,085.8 | 4,288.1 |

| Stream (Mols) | $C_2H_2$ Stripper Overhead Vapors (22) | High Pressure Absorber (23) Lean Solvent | $C_2H_2$ Stripper Kettle (25) Liquid | Fractionated Heavies (26) | High Pressure Absorber (27) Inlet | High Pressure Absorber (28) Rich Solvent | High Pressure Absorber (29) Overhead |
|---|---|---|---|---|---|---|---|
| Methane and lighter | | | | | | | |
| Carbon dioxide | | | | | | | |
| Acetylene | 217.4 | | | | 4.0 | 4.0 | Trace |
| Ethylene | | | | 13.5 | 432.2 | 164.7 | 267.5 |
| Ethane and heavier | 13.5 | | | 13.7 | | | |
| Solvent (DMF) | | 436.0 | 4,057.2 | | | 436.0 | |
| Totals | 230.9 | 436.0 | 4,057.2 | 27.2 | 436.2 | 604.7 | 267.5 |

Reasonable variation and modification are possible within the scope of the foregoing disclosure, the drawing, and the appended claims to the invention.

I claim:

1. A process for the separation of ethylene and acetylene from a gaseous mixture containing the same in approximately equal proportions which comprises: introducing said mixture to the lower portion of a first absorber zone operating at a first pressure and passing the same upwardly countercurrent to a downwardly moving stream of a lean solvent selective for said acetylene; passing ethylene concentrate containing some acetylene from the upper portion of said first absorber zone to a fractionation zone; drawing solvent enriched with acetylene from the lower portion of said first absorber and passing the same to a first stripping zone; passing additional stripped ethylene from the upper portion of said first stripping zone to the lower portion of said first absorber zone; drawing solvent further enriched with acetylene from the lower portion of said first stripping zone and passing the same to a second stripping zone; recovering acetylene product from the upper portion of said second stripping zone; drawing stripped solvent from the bottom portion of said second stripping zone suitable for further use; removing light gases from said fractionation zone; drawing ethane and higher hydrocarbons from said fractionation zone;

passing a stream rich in acetylene and ethylene from said fractionation zone to a second absorption zone operating at a second pressure, said second pressure being considerably higher than said first pressure; recycling solvent rich in acetylene from the bottom portion of said second absorber to said first stripping zone; and recovering ethylene product substantially free of acetylene from the upper portion of said second absorber zone.

2. A process for the separation of ethylene and acetylene from a gaseous mixture containing the same in approximately equal proportions which comprises: introducing said mixture to the lower portion of a first absorber zone operating at a first pressure and passing the same upwardly countercurrent to a downwardly moving stream of a lean solvent selective for said acetylene; passing ethylene concentrate containing some acetylene from the upper portion of said first absorber zone to a fractionation zone; drawing solvent enriched with acetylene from the lower portion of said first absorber and passing the same to a first stripping zone; passing additional stripped ethylene from the upper portion of said first stripping zone to the lower portion of said first absorber zone; drawing solvent further enriched with acetylene from the lower portion of said first stripping zone and passing the same to a second stripping zone; recovering acetylene product from the upper portion of said second stripping zone; drawing stripped solvent from the bottom portion of said second stripping zone suitable for further use; removing light gases from the upper portion of said fractionation zone; drawing ethane and higher hydrocarbons from said fractionation zone; drawing a stream rich in ethylene and acetylene from said fractionation zone and passing the same to a second absorption zone operating at a second pressure, said second pressure being considerably higher than said first pressure; recycling solvent rich in acetylene from the bottom portion of said second absorber to said first absorber zone; and recovering ethylene product substantially free of acetylene from the upper portion of said second absorber zone.

3. A process for the separation of ethylene and acetylene from a gaseous mixture containing the same in approximately equal proportions which comprises: introducing said mixture to the lower portion of a first absorber zone operating at a first pressure and passing the same upwardly countercurrent to a downwardly moving stream of a lean solvent selective for acetylene; passing ethylene concentrate containing some acetylene from the upper portion of said first absorber zone to a fractionation zone; drawing solvent enriched with acetylene from the lower portion of said first absorber and passing the same to a first stripping zone; passing additional stripped ethylene from the upper portion of said first stripping zone to the lower portion of said first absorber zone; drawing solvent further enriched with acetylene from the lower portion of said first stripping zone and passing the same to a second stripping zone; recovering acetylene product from the upper portion of said second stripping zone; drawing stripped solvent from the bottom portion of said second stripping zone suitable for further use; removing light gases from said fractionation zone; drawing ethane and higher hydrocarbons from said fractionation zone; drawing a stream rich in ethylene and acetylene from said fractionation zone and passing to a second absorption zone operating at a second pressure, said second pressure being considerably higher than said first pressure; recycling solvent rich in acetylene from the bottom portion of said second absorber to said first stripping zone, said stripped solvent being recycled to both said first and second absorbers; and recovering ethylene product substantially free of acetylene from the upper portion of said second absorber zone.

4. A method according to claim 1 wherein said solvent is selected from the group consisting of dimethylformamide, diethylformamide, diethylacetamide, dimethyl sulfoxide, acetic anhydride, and acetone.

5. A method for the separation of ethylene and acetylene from a gaseous mixture containing the same in approximately equal proportions which comprises: introducing said mixture to the lower portion of a first absorber zone operating at a first pressure and passing the same upwardly countercurrent to a downwardly moving stream of a lean dimethylformamide; passing ethylene concentrate containing some acetylene from the upper portion of said first absorber zone to the middle portion of a fractionation zone; drawing dimethylformamide enriched with acetylene from the lower portion of said first absorber and passing the same to a first stripping zone; passing additional stripped ethylene from the upper portion of said first stripping zone to the lower portion of said first absorber zone; drawing dimethylformamide further enriched with acetylene from the lower portion of said first stripping zone and passing the same to the middle portion of a second stripping zone; recovering acetylene product from the upper portion of said second stripping zone; drawing stripped dimethylformamide from the bottom portion of said second stripping zone suitable for further use; passing light gases from the upper portion of said fractionation zone; drawing ethane and higher hydrocarbons from the lower portion of said fractionation zone; drawing dimethylformamide rich in ethylene and acetylene from said fractionation zone and passing the same to the middle portion of a second absorption zone operating at a second pressure, said second pressure being considerably higher than said first pressure; recycling dimethylformamide rich in acetylene from the bottom portion of said second absorber to the middle portion of said first absorber zone; and recovering ethylene product substantially free of acetylene from the upper portion of said second absorber zone.

6. A method for the separation of ethylene and acetylene from a gaseous mixture containing the same in approximately equal proportions which comprises: introducing said mixture to the lower portion of a first absorber zone operating at a first pressure and passing the same upwardly countercurrent to a downwardly moving stream of a lean dimethylformamide selective for said acetylene; passing ethylene concentrate containing some acetylene from the upper portion of said first absorber zone to the middle portion of a fractionation zone; drawing dimethylformamide enriched with acetylene from the lower portion of said first absorber and passing the same to a first stripping zone; passing additional stripped ethylene from the upper portion of said first stripping zone to the lower portion of said first absorber zone; drawing dimethylformamide further enriched with acetylene from the lower portion of said first stripping zone and passing the same to the middle portion of a second stripping zone; recovering acetylene product from the upper portion of said second stripping zone; passing light gases from the upper portion of said fractionation zone; drawing ethane and higher hydrocarbons from the lower portion of said fractionation zone; drawing a stream rich in acetylene and ethylene from said fractionation zone and passing the same to the middle portion of a second absorption zone operating at a second pressure, said second pressure being considerably higher than said first pressure recycling dimethylformamide rich in acetylene from the bottom portion of said second absorber to the middle portion of said first absorber zone; drawing stripped dimethylformamide from the bottom portion of said second stripping zone and recycling to both said first and second absorbers; and recovering ethylene product substantially free of acetylene from the upper portion of said second absorber zone.

7. The process of claim 4 wherein said first pressure is about 30 p.s.i.a. and said second pressure is about 275 p.s.i.a.

8. The process of claim 5 wherein said first pressure is about 30 p.s.i.a. and said second pressure is about 275 p.s.i.a.

9. A process for the separation of a de-oiled feedstock containing about 11 percent acetylene and about 14 percent ethylene which comprises:

introducing said feedstock to the lower portion of a first absorber zone operating at about 30 p.s.i.a. and passing the same upwardly countercurrent to a downwardly moving stream of dimethylformamide; passing a concentrate containing about 23 percent ethylene and about 0.2 percent acetylene from the upper portion of said first absorber zone to a fractionation zone;

drawing solvent enriched with acetylene from the lower portion of said first absorber and passing the same to a first stripping zone;

passing additional stripped ethylene from the upper portion of said first stripping zone to the lower portion of first absorber zone;

drawing solvent further enriched with acetylene from the lower portion of said first stripping zone and passing the same to a second stripping zone;

recovering acetylene product from the upper portion of said second stripping zone, drawing stripped solvent from the bottom portion of said second stripping zone suitable for further use;

removing light gases from said fractionation zone; drawing ethane and higher hydrocarbons from said fractionation zone; passing a stream rich in acetylene and ethylene from said fractionation zone to a second absorption zone operating at about 275 p.s.i.a.;

recycling solvent-rich acetylene from the bottom portion of said second absorber to said first stripping zone; and recovering ethylene product from the upper portion of said second absorber zone.

References Cited by the Examiner

UNITED STATES PATENTS

| | | | |
|---|---|---|---|
| 2,805,733 | 10/1957 | Stanton | 260—679 |
| 2,917,563 | 12/1959 | Dye | 260—677 |
| 2,942,042 | 6/1960 | Folz | 260—677 |
| 2,943,703 | 7/1960 | Thayer | 260—679 |

FOREIGN PATENTS

| | | |
|---|---|---|
| 816,231 | 7/1959 | Great Britain. |

OTHER REFERENCES

Stanton: "Petroleum Refiner," 1959, vol. 38, No. 3 (pages 209–214).

ALPHONSO D. SULLIVAN, *Primary Examiner.*

D. S. ABRAMS, *Assistant Examiner.*